United States Patent Office 2,934,426
Patented Apr. 26, 1960

2,934,426

RECOVERY OF HIGH PURITY PENTACHLORIDES OF NIOBIUM AND TANTALUM FROM MIXTURES THEREOF

Alfred Mayer, Ottawa, Ontario, Canada, assignor to Quebec Metallurgical Industries Ltd., Ottawa, Ontario, Canada, a corporation of Canada No Drawing. Application August 5, 1957
Serial No. 676,384

1 Claim. (Cl. 75—84.5)

This invention relates to the treatment of niobium ore concentrates. The composition of these concentrates varies with the source of the ore and the concentrating method used. They usually contain a combined content of oxides of niobium and tantalum of 55 to 65 percent by weight, the ratio of niobium to tantalum varying from about 1 to 1 up to about 20 to 1. They also usually contain oxide impurities such as oxides of iron, tin, manganese, silicon, titanium, zirconium, aluminum and rare earths. The Nigerian, South African or Norwegian concentrates usually contain a combined content of $Nb_2O_5$ and $Ta_2O_5$ of 60 to 65 percent by weight together with 20 to 30 percent $Fe_2O_3$, 0.5 to 8 percent $SnO_2$, 0.5 to 3 percent MnO and less than 1 percent each of $SiO_2$, $TiO_2$, $Al_2O_3$, $ZrO_2$ and rare earths. The British Columbia concentrate usually contains a combined content of $Nb_2O_5$ and $Ta_2O_5$ of more than 55 percent by weight, the remainder being mostly $TiO_2$ with only very small amounts of other oxide impurities. The invention is applicable for treating any niobium ore concentrate or any ferro-niobium obtained therefrom to recover substantially all their tantalum and niobium contents in the form of oxides, chlorides or metals of high purity.

At present the world production capacity for niobium is extremely small and probably is not greater than about 25,000 pounds a year. Very few manufacturers are in a position to supply niobium metal in lots greater than 50 pounds at one time and the price for high purity niobium sponge metal (over 99%) ranges from about $55.00 to $100.00 per pound. This suggests that the process costs of these manufacturers are high.

It is well known that it is difficult to separate niobium from tantalum because of their chemical similarity. The failure to find a satisfactory solution of this difficulty probably is the principal reason for the present high price of niobium metal and the low world production capacity of this metal. It has been reported that one manufacturer produces niobium metal by a process involving direct reduction of high purity niobium oxide with carbon under vacuum. The high purity oxide is obtained by a liquid-liquid extraction separation process (Chemical Week, Tech. News Letter, April 8, 1956). Another company is experimenting with the electrolytic extraction of niobium and tantalum from fused fluoride-chloride baths (111th Meeting of the Electrochem. Society, May 1957, Washington, D.C.). Nothing has been published concerning the processes used by other manufacturers.

The present invention provides a method for treating niobium-tantalum ore concentrates by a plurality of cycles of steps whereby substantially complete recovery of niobium and tantalum in the form of substantially pure compounds is obtained and niobium and tantalum metals of at least 98 percent purity can be produced. The cost of producing this niobium metal is sufficiently low that a price of about one half the minimum price quoted above is warranted.

In accordance with the method of the invention the niobium concentrate is reduced to obtain a ferro-niobium metal containing substantially all the niobium and tantalum content of the concentrate together with metal impurities but preferably having a low content of titanium. The ferro-niobium is chlorinated to convert all the metals thereof to volatile chlorides. The volatile chlorides are condensed to obtain two condensates, one containing most of the chlorides of the minor impurities and a principal condensate which is a mixture of chlorides of niobium, tantalum and iron with a small amount of chlorides of the minor impurities, such as titanium, tin, silicon and aluminum.

The mixture of chlorides of niobium, tantalum and iron then is subjected to a first distillation operation. In this operation, a first condensate is collected containing the chlorides of the remaining minor impurities together with a small amount of chlorides of niobium and tantalum and a principal condensate is obtained containing a mixture of chlorides of niobium and tantalum. The distillation residue contains all the iron in the form of ferric and ferrous chlorides together with a small amount of niobium chloride which has drained back into the still pot. This residue is treated by the basic sulphate precipitation method as described hereinafter to obtain high purity niobium oxide. The first condensate also may be treated by the basic sulphate precipitation method to recover the niobium and tantalum contents as oxides.

The principal condensate obtained from the above distillation operation containing the chlorides of tantalum and niobium then is subjected to a second distillation operation. In this operation, a principal condensate is obtained which is substantially pure niobium pentachloride and a second condensate is collected which is rich in tantalum chloride but contains some niobium chloride. The pure niobium pentachloride is converted to pure niobium sponge metal by reaction with magnesium metal. The second condensate is redistilled and a fraction is condensed as substantially pure tantalum pentachloride, the remainder being recycled to said second distillation operation for retreatment. The tantalum pentachloride can be converted to sponge metal by a process analogous to the one described herein for niobium.

It will be noted that in each cycle of steps of the method of the invention three principal products are recovered, namely, (1) pure tantalum pentachloride which can be converted to pure tantalum metal or oxide, (2) pure niobium pentachloride which can be converted to pure niobium sponge metal or oxide and (3) a mixture of tantalum and niobium pentachlorides which is recycled for retreatment in a subsequent cycle of steps. The latter mixture of tantalum and niobium pentachlorides usually constitutes about 15 percent of the combined tantalum and niobium content of the original concentrate and its components are separately recovered in pure form in the subsequent cycles of steps.

As previously mentioned, the residue from the first distillation operation mentioned above, which is principally iron chlorides but contains some niobium chloride, may be treated by a method described hereinafter to obtain high purity niobium oxide. This niobium oxide may be reduced by the alumino-thermit process using high purity oxides of other metals, such as iron, nickel, cobalt, tungsten, molybdenum, copper or tin, as the reaction initiators, to obtain high purity niobium alloys.

The following is a more complete and more detailed description of the steps of the method of the invention:

PREPARATION OF FERRO-NIOBIUM

The niobium concentrate is mixed with aluminum and, if necessary, iron oxide and reduced by the alumino-thermit process. Addition of iron oxide is not necessary with some ores having a relatively high iron content. Fluxes like calcium oxide, which help reduce titanium oxide, are excluded from the charge as much as possible. The iron oxide acts as a reaction initiator and its reduction to metal serves to facilitate coalescence of the other metals produced. Usually, a charge is used containing an amount of iron oxide sufficient to form a ferro-niobium having an iron content between about 25 to 35 percent by weight. The amount of aluminum used should not be greater than that calculated to react with the total oxygen content of the charge less the oxygen content of titanium oxide. By so controlling the composition of the charge, most of the titanium oxide content of the concentrate is not reacted and is slagged off. Consequently, a ferro-niobium is obtained having a very low titanium content regardless of the amount of titanium oxide in the concentrate. The preparation of a ferro-niobium having a low titanium content is advantageous since it greatly reduces the amount of chlorine consumed in the subsequent chlorination step and reduces the complexity of the equipment required to deal with the condensation of chlorides. On cooling the reaction mass, the metal solidifies in a solid slab surrounded by slag. The slag breaks off cleanly from the metal surface. Slag at the bottom of the metal billet usually is a smooth, fused saucer about one half to one inch thick while the top of the metal is covered by a layer of fused slag several inches thick. A typical ferro-niobium produced from African ore concentrate contains in percent by weight 55 niobium, 7 tantalum, 27.5 iron, 3.1 aluminum, 5.4 tin, 1.1 manganese and about 0.1 titanium. A typical ferro-niobium produced from the British Columbia concentrate previously mentioned contains in percent by weight 61 niobium, 2.2 tantalum, 31.2 iron, 2.2 aluminum and 1.6 titanium.

CHLORINATION OF FERRO-NIOBIUM

The ferro-niobium billet is crushed in a jaw-crusher to about ⅜ inch chips and charged into a refractory lined shaft furnace with a gas tight shell conventionally used for chlorination. The charge is preheated electrically to about 500° C. and then chlorine is passed in from below the bed. The chlorination reaction is exothermic and can be controlled by the rate of chlorine addition. A suitable operating temperature is between about 600° C. to 1000° C. When the first charge is fully chlorinated, the heat content of the furnace usually is sufficient to raise the temperature of the next charge to 500° C. without further heating.

All the metal chlorides are volatile and no residue is left in the chlorinator. The chlorides are condensed to liquid and solid in a train of collecting vessels and the tail gas (chlorine) is passed through a dust collector before being led to a caustic soda scrubber. Thus, a condensate is collected containing all the chlorides of niobium, tantalum and iron. The chlorides of the minor impurities, such as chlorides of silicon, titanium, tin or aluminum are condensed as a separate condensate and little of the minor impurities are condensed with the chlorides of niobium, tantalum and iron.

FIRST DISTILLATION

The condensate from the chlorination step containing the mixture of chlorides of niobium, tantalum and iron is subjected to distillation. For this purpose, a fractionating column six feet long, packed with Raschig rings, was used. The vessel in which these chlorides were condensed and collected is attached to the column and used as the still pot. The still pot is heated to the boiling point of the chlorides and the column held on total reflux for several hours until equilibrium is established. During this time most of the light fractions, i.e., chlorides of titanium, tin, silicon and aluminum, are removed. The distillation then is started at a very high reflux ratio to remove the remaining traces of the above mentioned light fractions together with small amounts of the pentachlorides of tantalum and niobium. These fractions are condensed at temperature between 200° C. and 245° C. They may be treated to recover the tantalum and niobium as oxides by the basic sulphate precipitation method described hereinafter. After these fractions have been removed, the distillation is continued until no more distillate is obtained. During this operation the still pot temperature is allowed to rise gradually to 310° C. During the latter period, the main distillate is condensed at a temperature between 245° C. and 254° C. and consists of a mixture of niobium and tantalum pentachlorides. The residue in the still pot consists of ferric and ferrous chlorides together with a small amount of niobium pentachloride which has drained back into the still pot from the column. This residue is treated by the basic sulphate precipitation method described hereinafter to recover high purity niobium oxide.

SECOND DISTILLATION

The main condensate obtained from the first distillation step consisting of chlorides of niobium and tantalum is subjected to distillation using a fractionating column similar to that used in the first distillation step except that it has a length of 20 feet. The vessel in which these chlorides were collected is attached to the column and used as the still pot. The still pot is heated to a temperature starting at 245° C. and rising to 258° C. A first fraction of tantalum pentachloride-rich liquid is condensed at a temperature between 238° C. and 251° C. A fraction of pure niobium pentachloride is condensed at a temperature between 251° C. and 254° C.

The tantalum pentachloride-rich liquid is re-distilled and a fraction of pure tantalum pentachloride is condensed at a temperature between 238° C. and 239.5° C. The remaining higher boiling fraction is collected and recycled to the second distillation step for retreatment in a subsequent cycle of operations.

REDUCTION OF NIOBIUM PENTACHLORIDE TO NIOBIUM SPONGE METAL

The pure niobium pentachloride obtained from the previous step is reduced to niobium sponge metal by reaction with pure magnesium metal at a temperature of 800° to 900° C. For this purpose, the niobium pentachloride may be introduced as vapor or liquid into a reactor containing slightly more than the stoichiometric amount of magnesium. Another suitable method for introducing the chloride and magnesium into the reactor is to place the chloride in pure magnesium cans and drop the cans into the reactor. When the reaction is complete, a large portion of the magnesium chloride is removed by tapping the reactor and allowing the magnesium chloride to drain in the molten state from the reactor under an inert gas blanket. This is not an essential step but allows a smaller vacuum sublimation retort to be used in the subsequent step. After cooling the remainder of the reaction mass in an inert atmosphere, niobium sponge metal is obtained associated with some magnesium chloride and the excess of magnesium metal used. This crude sponge metal is now heated in a retort in vacuo at about 900° C. to cause the magnesium chloride and magnesium metal to sublime away and condense in the cooler portions of the retort. After cooling, the niobium metal is obtained in the form of pure sponge metal. The magnesium chloride and magnesium metal may be separated from the crude sponge metal by any other suitable means, such as by leaching with a dilute aqueous acid solution. A similar cycle of steps may be used to produce pure tantalum sponge metal. In place of magnesium metal, the reduction may be effected by means of other metallic reducing agents, such as sodium or calcium metals.

RECOVERY OF PURE NIOBIUM OXIDE FROM RESIDUES

The distallation residue from the first distillation described above is treated by a novel basic sulphate precipitation method to recover pure niobium oxide. This residue has a typical composition comprising in percent by weight 63.5 chlorine, 30.6 iron, 3.2 niobium, 0.1 tantalum to less than 0.02 tantalum, and 1.4 aluminum. To 100 pounds of this residue, 10 gallons of water is added and the mixture is digested for 3 hours at 80° to 100° C. The mixture then is diluted with 50 gallons of water. A solution of 4.6 pounds of ammonium sulphate dissolved in 2 gallons of water is added and the mixture is heated for 2 hours at a temperature between about 85° C. and 95° C. In place of ammonium sulphate, an equivalent amount of other water soluble sulphate may be used, such as sulphuric acid, or sulphates of sodium, potassium, magnesium, etc. This causes a granular niobium hydrated basic sulphate to be precipitated. The precipitate is removed by filtration, washed with water and a solution of ammonia, dried and then calcined to obtain pure niobium oxide.

This basic sulphate precipitation method also may be used to convert pure tantalum or niobium pentachlorides to pure tantalum or niobium oxides.

The invention is illustrated further by the following specific examples.

*Example 1*

A charge consisting of 56 pounds of British Columbia niobium concentrate, 20.5 pounds of magnetite and 19.8 pounds of aluminum was reduced by the alumino-thermit process. The concentrate contained 41.2 percent of niobium and 39.5 percent by weight of titanium dioxide. The ferro-niobium recovered weighed 36.5 pounds and contained in percent by weight 61 niobium, 2.2 tantalum, 31.2 iron, 2.2 aluminum and 1.6 titanium. The slag produced weighed 59.8 pounds and contained 1.00 percent by weight of niobium.

*Example 2*

A charge consisting of 232 pounds of African concentrate, 23 pounds of magnetite and 80.5 pounds of aluminum was reduced by the alumino-thermit process. The concentrate contained 39.4 percent niobium and 2.9 percent titanium by weight. The ferro-niobium recovered weighed 161 pounds and contained in percent by weight 55 niobium, 7 tantalum, 27.5 iron, 3.1 aluminum, 5.4 tin, 1.1 manganese and about 0.1 titanium. The slag produced weighed 175 pounds and contained 1.35 percent niobium by weight.

84 pounds of the ferro-niobium in the form of chips of about 3/8 inch size were placed in a conventional chlorinator leading to a train of condensing vessels and a dust collector. The charge was preheated electrically to about 500° C. and then chlorine was passed in below the bed. Since the chlorination reaction is exothermic, the temperature increased and was maintained between about 900° C. and 1000° C. by controlling the rate of chlorine admission to the chlorinator. All the ferro-niobium was converted to volatile metal chlorides and no residue was left in the chlorinator. A principal fraction of the volatile chlorides was condensed and collected consisting of a mixture of chlorides of iron, niobium and tantalum and containing a small amount of minor impurities, such as chlorides of tin, aluminum, manganese and titanium, most of the latter being condensed and collected separate from the principal condensate. The principal condensate weighed 214.4 pounds and contained in percent by weight 62 niobium chloride, 31.8 iron chloride, 5.1 tantalum chloride, 0.65 aluminum chloride, 0.45 tin chloride and about 0.1 titanium chloride. The product collected in the dust catcher weighed 19.1 pounds and contained 3.6 percent by weight of niobium from which 0.95 pound of niobium oxide was recovered by the basic sulphate precipitation method described hereinafter.

The vessel containing the 214.4 pounds of the above principal condensate was attached to a conventional fractionating column of six foot length and used as the still pot. The still pot was heated to a temperature starting at 250° C. and rising to 310° C. A head fraction weighing 3.65 pounds was condensed at a temperature between 200° C. and 245° C from which 1.5 pounds of oxide containing 43 percent niobium and 31 percent tantalum by weight was recovered by the basic sulphate precipitation method described hereinafter. A main fraction weighing 134.5 pounds was condensed at a temperature between 245° C. and 254° C. The latter fraction contained 31.7 percent niobium and 3.8 percent tantalum by weight. The residue in the still pot weighed 64.7 pounds and contained 3.5 percent niobium by weight, the balance being essentially a mixture of ferric and ferrous chlorides. The difference in the weights of the material charged and the materials recovered is due principally to loss due to decomposition of ferric chloride to ferrous chloride and chlorine gas.

The vessel containing the 134.5 pounds of the main condensate from the last distillation operation was attached to a conventional fractionating column of 20 foot length and used as the still pot for a second distillation. The still pot was heated to a temperature starting at 245° C. and rising to 258° C. A first fraction of tantalum-rich liquid was condensed at a temperature between 238° C. and 251° C. This fraction weighed 17 pounds and contained about 15 percent niobium and 28.5 percent tantalum by weight. A main fraction of 116.5 pounds of substantially pure niobium pentachloride was condensed at a temperature between 251° C. and 254° C. The first fraction was re-distilled and 9.4 pounds of substantially pure tantalum pentachloride was collected at a temperature between 238° C. and 239.5° C. with a niobium content of 1.91 percent and a tantalum content of 47.6 percent, the remainder of the fraction weighing 7.59 pounds and containing 4.6 percent tantalum and 31.2 percent niobium being set aside for recycling to the above mentioned second distillation operation in a subsequent cycle of operations.

The temperatures given in this example are those actually obtained in operation and are subject to calibration error. They are accurate to about 1.5° C.

30 pounds of the pure niobium pentachloride was reduced with 9 pounds of magnesium metal at a temperature of 800° to 900° C. to produce a reaction mixture of niobium metal, magnesium chloride and the excess magnesium metal. The reactor was tapped to permit a portion of the molten magnesium chloride to drain out. After cooling in an inert atmosphere, the remainder of the reaction mass was removed and heated in a retort in vacuo at a temperature of about 900° C. to cause the remainder of magnesium chloride and magnesium metal to sublime away and condense in the cooler portions of the retort. The niobium sponge metal obtained weighed 9.85 pounds and was 99 percent pure. Metal recovered as cleanings from the retort weighed 0.55 pound and was set aside for recycling to the chlorination step.

Several batches of niobium concentrate were treated by the method of the invention and the residue of the first distillation step of each run was set aside. A sample of 100 pounds was taken from these accumulated residues and treated by the previously mentioned basic sulphate precipitation method to recover its niobium content as oxide. This sample analyzed in percent by weight 63.5 chlorine, 30.6 iron, 3.2 niobium, less than 0.1 tantalum and 1.4 aluminum. To this 100 pound sample, 10 gallons of water was added and the mixture digested at a temperature of 80° to 100° C. for 3 hours. The mixture then was diluted with 50 gallons of water. Then, 4.6 pounds of ammonium sulphate dissolved in 2 gallons of water was added and the mixture was heated at 85° C. to 95° C. for 2 hours causing a granular niobium hydrated basic sulphate to be precipitated. The precipitate was removed by filtration, washed with water and ammonia solution, dried and then calcined to obtain 4.5 pounds of niobium oxide containing 69.2 percent niobium by weight or 3.1 pounds, representing a recovery of 97 percent. The product analyzed in percent by weight 98.7 $Nb_2O_5$, 0.3 $Ta_2O_5$, 0.6 loss on ignition and 0.3 ferric iron oxide.

I claim:

In a method for obtaining substantially pure niobium pentachloride and substantially pure tantalum pentachloride, the plurality of cycles of steps comprising forming a mixture consisting essentially of said chlorides in which the amount of niobium pentachloride by weight is substantially greater than twice the amount of tantalum pentachloride by weight, heating said mixtxure at a temperature rising to about 258° C. to vaporize the mixture completely and collecting a first condensate at a temperature between 238° C. and 251° C. and a second condensate at a temperature between 251° C. and 254° C., said first condensate consisting essentially of said chlorides containing an amount of tantalum pentachloride not substantially less than twice the amount of niobium pentachloride by weight, said second condensate being substantially pure niobium pentachloride, heating said first condensate to vaporize the mixture completely and collecting a condensate at a temperature between 238° C. and 239.5° C. consisting of substantially pure tantalum pentachloride and a last condensate of the remaining higher boiling fraction consisting essentially of said chlorides and containing an amount of niobium pentachloride substantially greater than twice the amount of tantalum pentachloride by weight, and recycling said last condensate to the first heating operation in a subsequent cycle of steps.

References Cited in the file of this patent

UNITED STATES PATENTS

| | | |
|---|---|---|
| 1,620,880 | Filmer | Mar. 15, 1927 |
| 2,205,854 | Kroll | June 25, 1940 |
| 2,551,733 | Dunn et al. | May 8, 1951 |
| 2,744,060 | Eaton | May 1, 1956 |
| 2,763,542 | Winter | Sept. 18, 1956 |
| 2,766,112 | Schafer | Oct. 9, 1956 |
| 2,778,726 | Winter et al. | Jan. 22, 1957 |
| 2,789,896 | Coffer | Apr. 23, 1957 |
| 2,852,446 | Bromberg | Sept. 16, 1958 |